(12) United States Patent
Dorn et al.

(10) Patent No.: US 8,033,580 B2
(45) Date of Patent: Oct. 11, 2011

(54) WORKING FLUID FEEDING DEVICE

(75) Inventors: Stefan Dorn, Arnstein (DE); Alfred Haub, Luelsfeld (DE); Andreas Schupies, Boehlen (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 12/815,525

(22) Filed: Jun. 15, 2010

(65) Prior Publication Data
US 2010/0243089 A1    Sep. 30, 2010

Related U.S. Application Data

(63) Continuation of application No. 11/260,601, filed on Oct. 27, 2005, now Pat. No. 7,766,395.

(51) Int. Cl.
*F16L 13/14* (2006.01)
(52) U.S. Cl. ............... 285/382; 285/124.5; 285/328; 285/332; 285/334.4; 285/382.7
(58) Field of Classification Search ............... 285/9.2, 285/40, 100, 124.5, 148.23, 246, 303, 328, 285/330, 332, 334.4, 382, 382.7, 384, 389–390, 285/917; 138/89; 411/301–302, 324, 333–335, 411/369, 371.1, 542
See application file for complete search history.

(56) References Cited

U.S. PATENT DOCUMENTS

| | | | | |
|---|---|---|---|---|
| 1,959,529 A * | 5/1934 | Fox et al. | ........................ | 285/9.2 |
| 4,173,363 A * | 11/1979 | Stearns | .................... | 285/148.23 |
| 4,420,022 A * | 12/1983 | Landry | ........................... | 141/18 |
| 4,787,656 A * | 11/1988 | Ryder | ....................... | 285/148.23 |
| 5,848,813 A * | 12/1998 | Albrecht | ....................... | 285/332 |
| 5,954,374 A * | 9/1999 | Gallagher et al. | ............ | 285/332 |
| 7,748,750 B2 * | 7/2010 | Raghavan et al. | ......... | 285/124.5 |

* cited by examiner

*Primary Examiner* — Aaron Dunwoody
*Assistant Examiner* — Fannie Kee
(74) *Attorney, Agent, or Firm* — Michael J. Striker (57) ABSTRACT

A device (30) for feeding working fluid to an assembly (14) requiring working fluid includes at least one fluid channel (20, 20a-20d) extending from a surface (16a) and at least one screw element (22, 24) capable of being screwed from the surface (16a) into the at least one fluid channel (20, 20a-20d) for feeding working fluid into the fluid channel (20, 20a-20d) or for closing the fluid channel (20, 20a-20d), the at least one fluid channel (20, 20a-20d) having a first section (32) directly adjacent to the surface (16a) with a larger width, a second section (36) with a smaller width and, between the first section (32) and the second section (36), having a first transition region (34) with an annular surface (34a), and the screw element (22, 24) having at least one sealing surface (22c, 24c) capable of being brought into sealing engagement with the annular surface (34a). The fluid channel (20, 20a-20d) is deformable in the second section (36) by a pressure applied by the screw element (22, 24) to the annular surface (34a) in the sense of reducing the volume of the fluid channel in the second section (36).

22 Claims, 5 Drawing Sheets

WORKING FLUID FEEDING DEVICE

CROSS-REFERENCE TO RELATED APPLICATIONS

The present application is a continuing application of co-pending U.S. application Ser. No. 11/260,601, filed Oct. 27, 2005 now U.S. Pat. No. 7,766,395.

BACKGROUND OF THE INVENTION

The present invention relates to a device for feeding working fluid to an assembly requiring working fluid, including at least one fluid channel extending from a surface, and at least one screw element capable of being screwed from the surface into the at least one fluid channel for feeding working fluid into the fluid channel or to close the fluid channel.

The at least one fluid channel includes a first section directly adjacent to the surface having a larger width, a second section having a smaller width and, between the first section and the second section, a first transition region with an annular surface. The screw element includes at least one sealing surface capable of being brought into sealing engagement with the annular surface.

Working fluid feeding devices of this type are used, e.g., on the end faces of guide carriages of linear guide devices, the end faces of screw nuts of rolling element screw drives or similar devices based on rolling-contact bearing technology. The working fluid used is a lubricant, e.g., a lubricating grease or lubricating oil, e.g., in the form of oil-air or oil-mist lubrication. With regard for the related art, reference is made, e.g., to publication DE 198 30 140 A1.

An attachment capable of being attached to the assembly is provided with the known working fluid feeding device, the attachment including a total of four working fluid feed holes. The upper feed hole is provided for the case in which the guide carriage is installed underneath a table board and working fluid, e.g., lubricant, must be fed through the table board. The other three fluid channels are typically used to receive screw elements, e.g., stoppers, or elements for connecting a working fluid reservoir. With the known working fluid feeding device, problems with the seal integrity of the fluid channels occur repeatedly in practice, even when screw elements are used that cut the associated counterthread themselves in the attachment with the fluid channel.

Publication US 2003/0160450 A1 makes known a screwed connection for tubular parts, with which a cylindrical screw element has a front side on which an annular ridge is formed. In the screwed-in state, the annular ridge penetrates the material at the base of a cylindrical counternut and displaces it into a groove formed between the front side of the screw element and the base surface of the nut. In the screwed-in state, this results in a labyrinth-type seal. The disadvantage, however, is that an adequate seal can be ensured only the first time the screw element is screwed in.

Publication DE 8320655 U1 makes known a threaded pipe coupling for connecting pipes, with which an inner flange of the coupling has a circumferential sealing ridge on its axial end faces that deform plastically when the front edges of a screwed-in pipe are tightened, thereby creating a seal.

Systems also exist with which the seal between the screw element and the nut element is attained using a deformable element supported between two sealing surfaces, e.g., a rubber ring. Reference is made to publication U.S. Pat. No. 1,889,689 for example purposes only.

SUMMARY OF THE INVENTION

In contrast, the object of the present invention is to provide a simple-design working fluid feeding device with improved seal integrity, in particular after the screwed connection has been released numerous times.

This object is attained according to the present invention by a working fluid feeding device of the type stated initially, with which the fluid channel in the second section is deformable by a pressure applied by the screw element on the annular surface in the sense of reducing the fluid volume in the second section.

The sealing effect is attained here without the aid of additional components with a sealing effect (e.g., sealing rings or the like), simply via the sealing surface of the screw element being pressed against the annular surface. The contact pressure applied by the screw element initially results in tension being applied to the material of the fluid channel surrounding the annular surface and subsequently in a compensation motion of the material in the region of the fluid channel on which the end face is configured. As a result of this compensation motion, which is initially elastic, i.e., reversible, when the contact pressure is low, and, when the contact pressure is greater, can transition into a non-reversible plastic flow, a uniform, surface contact results between the annular surface of the fluid channel and the sealing surface(s) of the screw element, providing an adequate seal.

As soon as the material enclosing the annular surface has deformed, it is possible—within certain limits—to ensure an equally good seal of the screwed connection even when the screw element has been screwed in to different extents, because only the axial position of the sealing surface is displaced, without the surface of the contact region creating the seal or without the contact force between the annular surface and the screw element changing. This also makes it possible to easily compensate for manufacturing tolerances for the length of screw elements.

The geometry of the annular surface and the sealing surface need not change when the screwed connection is tightened, e.g., the annular surface and the sealing surface can be flat. This shape therefore does not change even after repeated loosening and tightening of the screwed connection, thereby enabling a comparable seal to be attained every time the screw element is screwed in. In addition to flat sealing surfaces, any other complementary shapes of annular surfaces and sealing surfaces are feasible, of course.

The fluid channel itself can be used as compensating space for the displaced material of the fluid channel. No arrangements need be made, therefore, to accommodate displaced material in the region of the abutting annular surface of the fluid channel/sealing surface(s) of the screw element.

If the fluid channel is elastically deformable in the first transition region and in the second section when pressure is applied, the same conditions are restored after the screwed connection is released as existed in the new state. Conditions of this type can be attained when the seal requirements are not too high and work can therefore be carried out with low contact pressure, or when the fluid channel is made of an elastic material in the region of the annular surface.

When the contact pressure is higher, as is often required to attain an improved seal, the fluid channel will deform plastically in the first transition region and in the second section when pressure is applied, in particular when the fluid channel is made of metal in this region. The flow motion can not be reversed after the screwed connection is released, but the shapes of the annular surface and the sealing surface are still substantially complementary. Since, in addition, adequate space still typically exists in the fluid channel to accommodate displaced material, it is possible to create another tight screwed connection, although the screw element may need to be screwed in slightly farther or a longer screw element may need to be used.

When the screw element is oriented along the longitudinal axis of the fluid channel, the sealing surface of the screw element is preferably diametrically opposed to the annular surface and has a shape that is complementary thereto. In the screwed-in state, the screw element along the sealing surface is therefore seated flush on the annular surface, i.e., the annular surface and the sealing surface abut each other not just at certain points, but over at least one contiguous surface region.

The annular surface can extend substantially orthogonally to the longitudinal axis of the fluid channel. In this case, the sealing engagement between the screw element and the annular surface can be easily attained by screwing the screw element into the fluid channel until it is seated flush and, therefore, in a sealing manner, on the annular surface. To this end, the annular surface can be formed, e.g., on an annular shoulder that is located in the transition region and substantially concentrically encloses the longitudinal axis of the fluid channel. This embodiment is particularly easy to manufacture.

To ensure flush contact between the annular surface and the sealing surface, it can be favorable to manufacture the attachment or at least its region that encloses the annular surface, e.g., out of plastic or a light metal alloy.

The length of the screw element capable of being screwed into the fluid channel is preferably sized such that the screw element is capable of being brought into sealing engagement with the annular surface. To this end, with the exemplary embodiments discussed above, the length of the screw element capable of being screwed in is greater than or equal to the distance between the annular surface and the surface. In terms of defining the expression "length capable of being screwed in", reference is made to the following:

Screw elements for feeding working fluid, e.g., grease fittings, are typically provided with an annular shoulder which, in the screwed-in state, rests on the surface, e.g., of an attachment that includes a lubricant fluid channel. The screwed-in length of a screw element of this type is given by the length of this screw element extending into the fluid channel. Stoppers can also be designed with an annular shoulder of this type. In this case, the same applies for the screwed-in length. It is also feasible, however, to use setscrew-type screw elements, in particular as stoppers. They can always be screwed into the fluid channel until they enter in a sealing engagement with the annular surface. In the context of the present invention, however, the length of a setscrew-type screw element capable of being screwed in is understood to be its entire length. In other words, the screw element is already in a sealing engagement with the annular surface when it comes to rest, flush, with the surface of the attachment or projects over it slightly.

The second section can include a first subsection adjacent to the first transition region and a second subsection adjacent to the first subsection. In this case it is advantageous when the width of the first subsection is smaller than that of the first section, but is larger than the width of the second subsection. A flange that projects inwardly into the fluid channel is then formed, on which the annular surface can be configured.

The first subsection of the second section can be configured such that it is capable of buckling in the axial direction of the fluid channel when pressure is applied to the annular surface. "Capable of buckling" can mean that the material of the first transition region and the second section are compressed. It can also mean that the second section is formed in a manner such that it can be folded together axially, e.g., it has walls capable of being folded together in the manner of an accordion. When the first subsection is axially deformed, a return force is generated that ensures that the material of the annular surface bears flush against the sealing surface(s) of the screw element.

When pressure is applied to the annular surface, the first subsection can be deformable such that the width of the fluid channel narrows in the region of the first subsection. The material of the first transition region and the second section displaced by the screw element is displaced inwardly into the region of the fluid channel provided for fluid flow, the cross section of which then narrows. This constriction is acceptable, however, in particular when an end stopper is to be placed in the fluid channel. In addition, by sizing the width of the first subsection accordingly, it can be ensured that, when the screw element is screwed in, the cross section of the fluid channel nearly corresponds to that of the second subsection.

The first subsection can include a circumferential surface section directly adjacent to the annular shoulder of the first transition region and a second transition region that connects the circumferential surface section with the second subsection, the second transition region being configured as the annular shoulder that concentrically encloses the longitudinal axis of the fluid channel. It is favorable when the surface of the second transition region that borders the fluid channel extends substantially orthogonally to the longitudinal axis of the fluid channel.

In all of the exemplary embodiments, the sealing effects can be increased further by providing a groove in an outer circumferential surface of the screw element, in which a sealing ring is capable of being located. In addition or as an alternative to, at least a portion of the thread of the screw element can be configured as a thread with a trapezoidal thread root, the diameter of which is slightly greater than the inner diameter of the first section of the fluid channel.

As a further development of the present invention, the first section and/or the second section of the fluid channel can be designed cylindrical in shape or, as an alternative, conical in shape, at least along a portion of its length.

Furthermore, the first section of the fluid channel can be provided with a thread, along at least a portion of its length. As an alternative, it is also possible, however—as was discussed above in context with the related art—for the thread to be cut into the circumferential wall surface of the first section of the fluid channel for the first time when the screw element is screwed in. A cylindrical embodiment of the fluid channel in the part in which the thread is configured has the advantage that a force—as desired per the requirement—can be applied to the contact surfaces located perpendicularly to the axis of the screw element.

The at least one fluid channel preferably extends from a surface of an attachment that is in fluid contact with the assembly. The attachment can be located such that it ensures good accessibility of the fluid channel openings during operation and is coupled with the assembly either directly or via suitable connecting elements, e.g., a table plate located above and provided with corresponding fluid channels. In the simplest case, the attachment is capable of being attached to the assembly.

As known per se from the related art, the attachment can be provided with a plurality of fluid channels. Furthermore, at least part of or, preferably substantially the entire attachment can be made of plastic.

BRIEF DESCRIPTION OF THE DRAWINGS

The present invention is explained below in greater detail using exemplary embodiments, with reference to the attached drawings.

FIG. 2: shows a schematic side view of an embodiment of the working fluid feeding device according to the present invention before a screw element is screwed in;

FIG. 3: shows a schematic side view of an embodiment of a working fluid feeding device according to the present invention with the screw element screwed in;

DETAILED DESCRIPTION OF THE PREFERRED EMBODIMENTS

Figure 1:
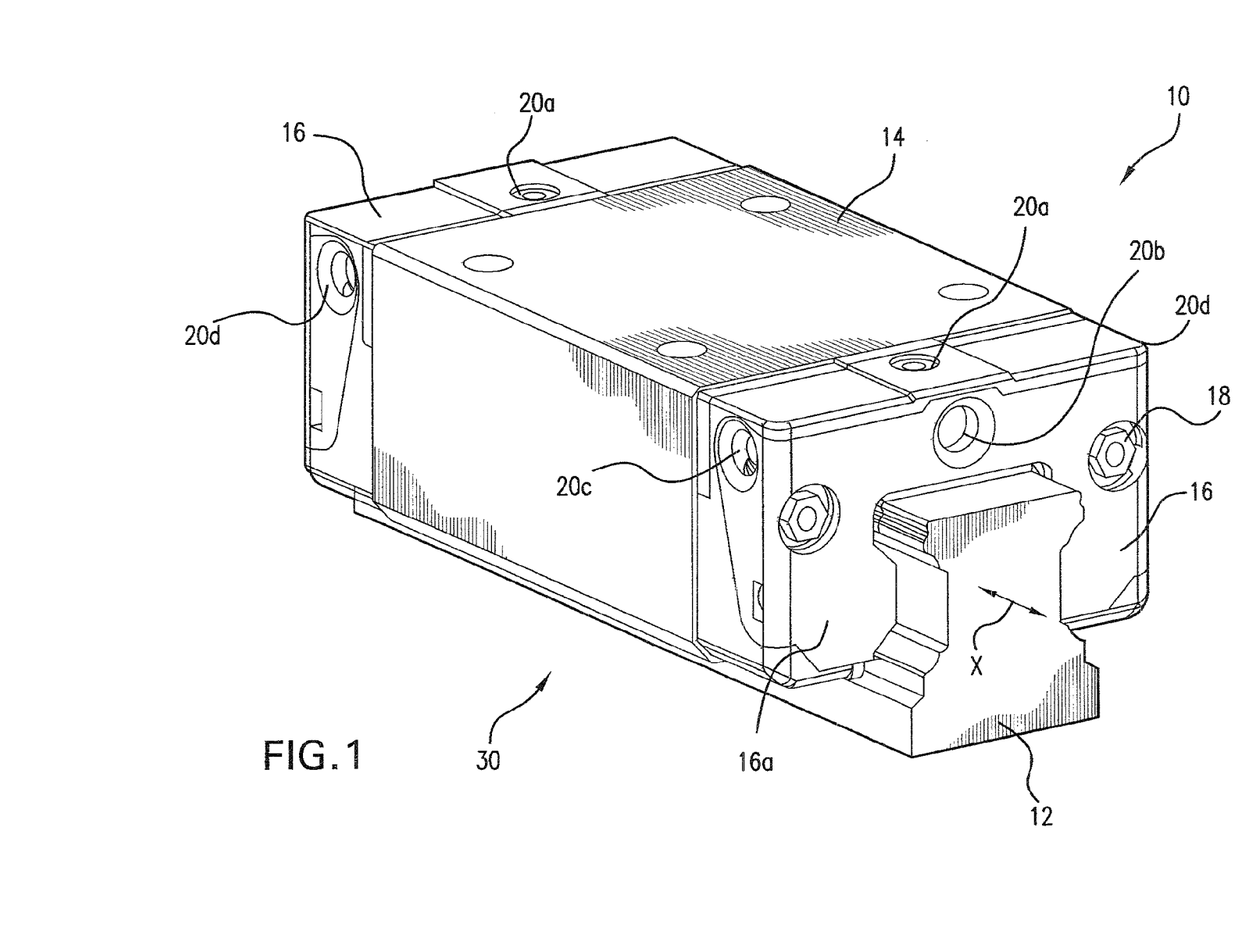
FIG. 1: shows a perspective view of a linear guide device as an example of a device based on rolling-contact bearing technology, with which the working fluid feeding device according to the present invention can be used.

FIG. 1 shows a linear guide device 10 as an example of a device based on rolling-contact bearing technology, with which the working fluid feeding device according to the present invention can be used. Linear guide device 10 includes a longitudinal guide rail 12 and a guide carriage 14 guided in a longitudinally-displaced manner on guide rail 12 in its longitudinal direction (double arrow X). Two end plates and/or attachments 16 are attached to its front ends in the longitudinal direction X, using fastening screws 18.

Figure 4:
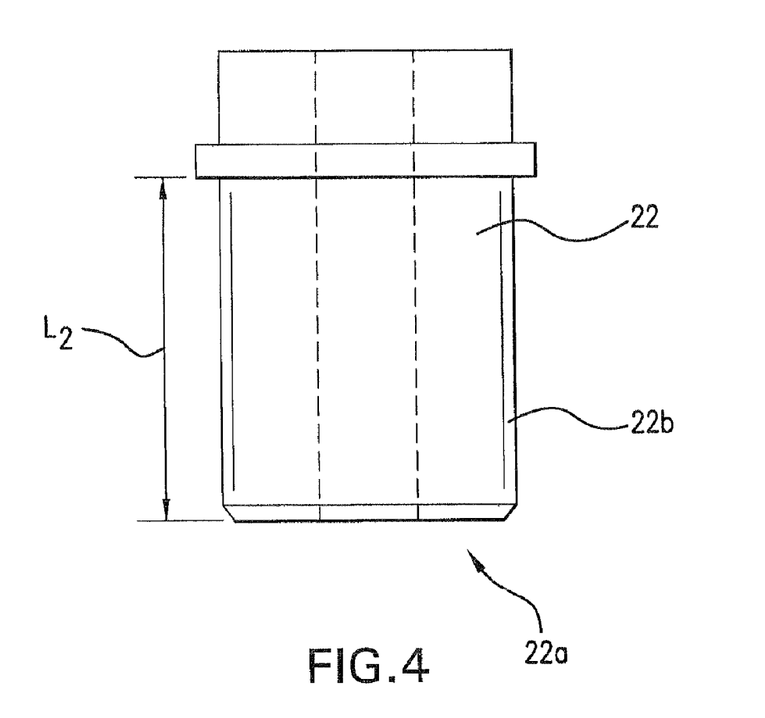
FIGS. 4 and 5: show views of two screw elements that can be used with the working fluid feeding device according to the present invention.
Figure 5:
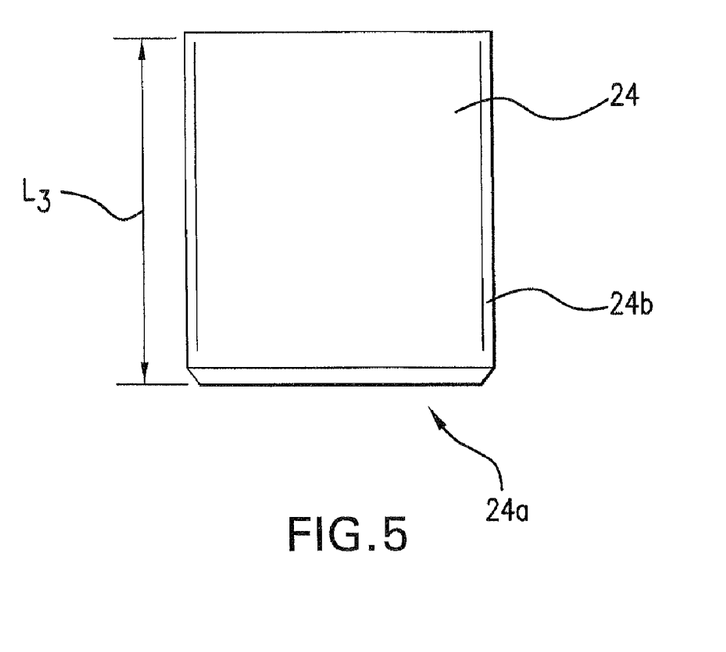

In the exemplary embodiment shown, four fluid channels 20a through 20d are formed in each of the two identically configured attachments 16, namely an upper fluid channel 20a, an end-face fluid channel 20b, and two lateral fluid channels 20c and 20d. Fluid channel 20d of anterior attachment 16, which is covered in FIG. 1 due to the perspective illustration, is shown on attachment 16 shown at the back in FIG. 1. Upper fluid channel 20a is provided for the case in which guide carriage 14 is installed underneath a table board and working fluid, e.g., lubricant, must be fed through the table board. The other three fluid channels serve to accommodate screw elements, e.g., a working fluid grease fitting 22 (refer to FIG. 4) or stoppers 24 (refer to FIG. 5).

Together, attachment 16, fluid channels 20a through 20d and screw elements 22, 24 form a working fluid feeding device 30 for feeding working fluid, e.g., lubricant such as lubricating oil or lubricating grease, to guide carriage 14. Fluid channels 20a through 20d can be equipped with a grease fitting 22, for example, while the other fluid channels are sealed tightly with stoppers 24.

The goal of the present application is to configure feed channels 20a through 20d (referred to hereinbelow jointly with reference numeral 20) and screw elements 22, 24 to match in a manner such that unintentional loss of working fluid is reliably prevented even after repeated opening and closing.

Figure 2:
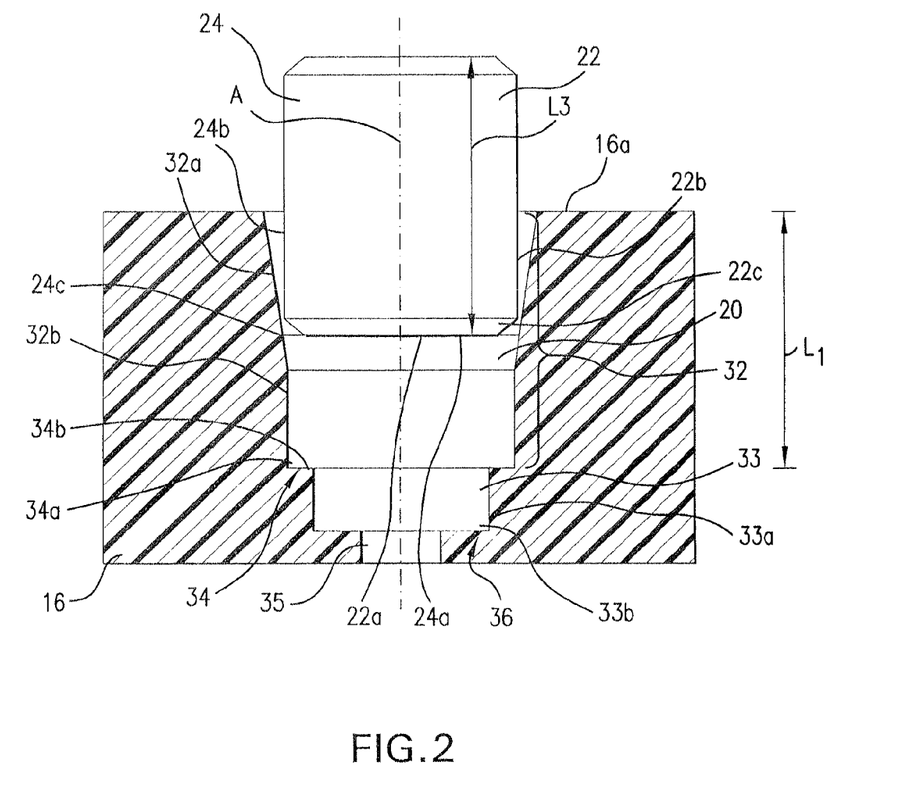

As shown in FIG. 2, fluid channel 20 extending from surface 16a of attachment 16 into attachment 16 includes a first section 32 and a second section 36 that transition into each other at a transition region 34. First section 32 includes a conical subsection 32a that leads into surface 16a of attachment 16 and a cylindrical subsection 32b adjacent to second section 36 having a smaller diameter than the outlet of the fluid channel at surface 16a.

Figure 3:
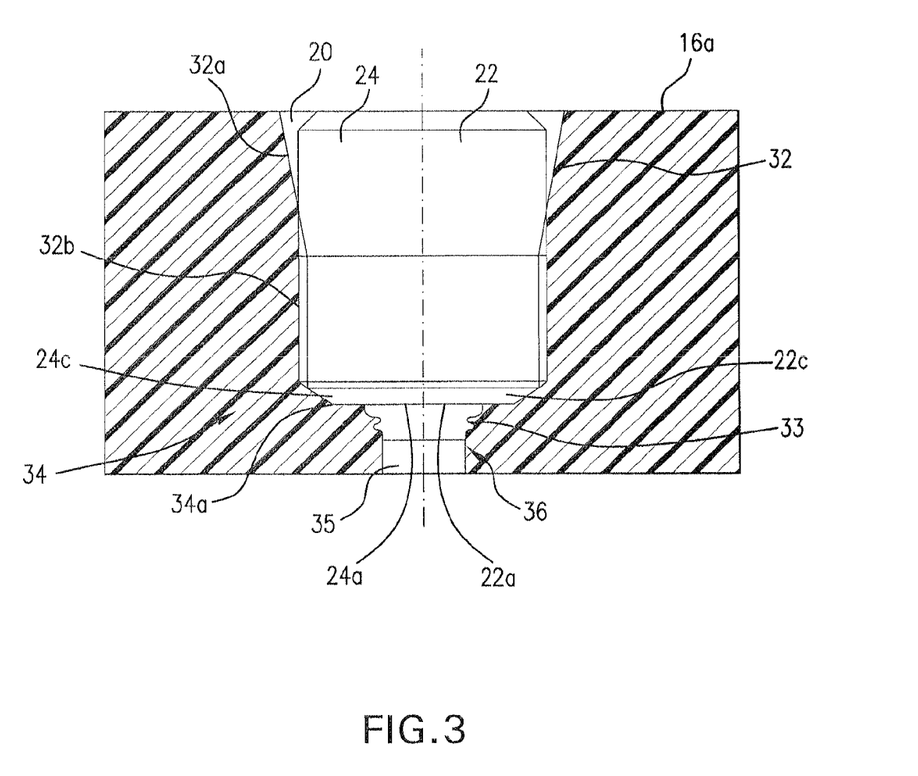

Screw elements 22, 24 are provided with a screw thread 22b and 24b on their outer circumference. The corresponding counterthread of first section 32 of fluid channel 20 can be configured therein when attachment 16 is manufactured or, as indicated in FIG. 3, they can be cut into the circumferential wall of first section 32 for the first time by thread 22b, 24b when screw elements 22, 24 are screwed into first section 32 of fluid channel 20. Threads that are cut for the first time when a screw element is screwed in have the advantage over prefabricated threads that they provide a greater seal against unintentional loss of working fluid.

Transition region 34 is formed by an annular shoulder 34b that forms an annular surface 34a on its side facing first section 32. A sealing surface 22c, 24c provided on the lower end face 22a, 24a of screw element 22, 24 enters into sealing engagement with this annular surface 34a. Unintentional loss of working fluid from fluid channel 20 is prevented as a result. To this end, depth L1 of first section 32 of fluid channel 20 is shorter, but at least equally long as length L2—capable of being screwed in—of working fluid grease fitting 22 or length L3—capable of being screwed in—of stopper 24. In the example shown, annular surface 34a extends substantially orthogonally to axis A of fluid channel 20 in transition region 34 between first section 32 and second section 36 of fluid channel 20. By locating the screw element along axis A of the fluid channel, as shown in FIG. 2, sealing surface 22c, 24c of the screw element is complementary in shape with annular surface 34a.

Second section 36 is formed by a first subsection 33—shown at the top in FIG. 2—and a second subsection 35 shown at the bottom in FIG. 2. Second subsection 35 substantially corresponds to the cross section of the fluid channel in which the working fluid flows during operation. First subsection 33 is wider than second subsection 35 and therefore—in the state shown in FIG. 2 before screw element 22, 24 is screwed in until it is tightly seated—has a larger cross section than second subsection 35. The cross section of first subsection 33 is still smaller than that of first, lower subsection 32b of first section 32, however. It therefore projects inwardly into the fluid channel and forms a bearing flange for end faces 22a, 24a of screw element 22, 24.

First subsection 33 includes a circumferential wall section 33a and a second transition region 33b to second subsection 35. Second transition region 33b also extends substantially orthogonally to fluid channel axis A.

The same working fluid feeding device as is FIG. 2 is shown in FIG. 3, but with screw element 22, 24 screwed in and located in the sealing position. In the situation shown, end face 22a, 24a of screw element is located with its outer region 22c, 24c in the circumferential direction entirely on annular surface 34a configured in first transition region 34. Region 22c, 24c therefore performs the function of a surface seal. It is obvious that, due to the pressure produced on annular surface 34a when the screw element is screwed in, annular surface 34a—along with annular shoulder 34b—has been displaced further into the fluid channel in the axial direction of the fluid channel, with the loss of axial extension of first subsection 33 of second section 36. The material displaced by the axial displacement of annular surface 34a and annular shoulder 34b has also collected in the space enclosed by first subsection 33 and thereby markedly reduced its cross section. As a result of both effects, the volume enclosed by the first subsection is reduced in size considerably compared with the situation shown in FIG. 2. It is obvious, however, that the space available for the working fluid still has a larger cross section than the cross section of second subsection 35.

Figure 6:
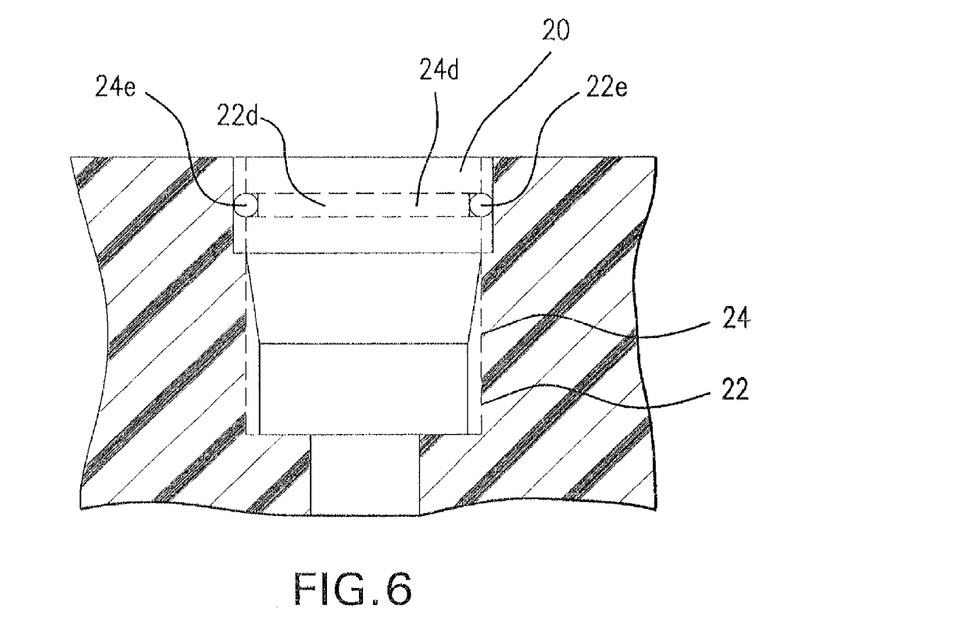
FIGS. 6 and 7: show illustrations that explain further embodiments of the working fluid feeding device according to the present invention.

The deformation of the first subsection shown in FIG. 2 is plastic, i.e., it does not reverse after the sealing engagement between sealing surface 22c, 24c and annular surface 34a is released. To tightly close the screw connection again, the screw element must be screwed in a little further to bring about an adequate plastic deformation of the material in first subsection 33. Since, in the region of the first subsection, space still remains in the fluid channel to receive material, a tight seal can be easily created again. As shown in FIG. 6, the seal integrity of the working fluid feeding device according to the present invention can be increased further and unintentional loss of working fluid from fluid channel 20 can be prevented by providing an annular groove 22*d*, 24*d* on the circumferential surface of screw element 22, 24, in which a sealing ring 22*e*, 24*e* is inserted that is in sealing engagement with the circumferential surface of fluid channel 20.

Figure 7:
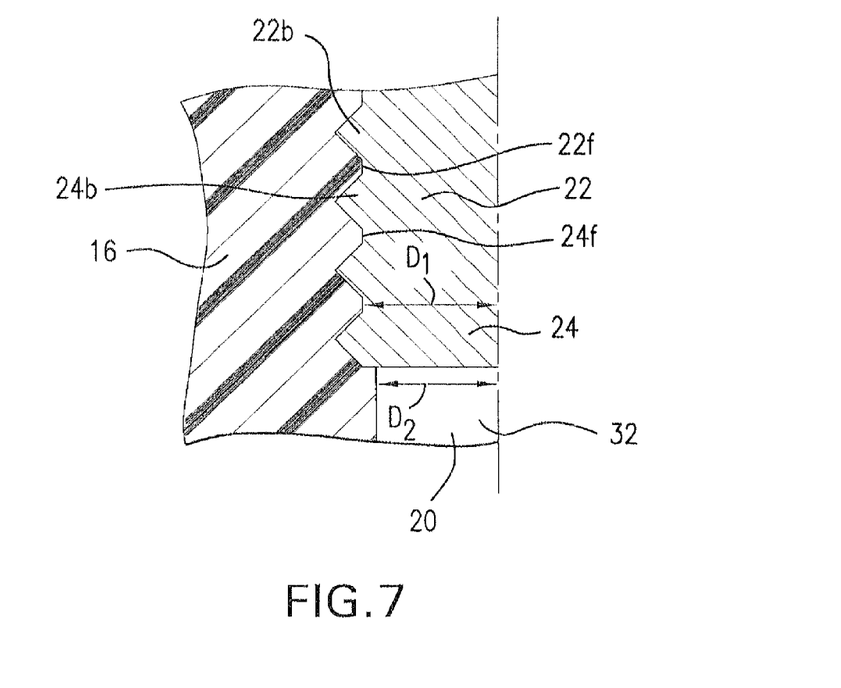

According to FIG. 7, to increase the seal integrity, thread 22*b*, 24*b* of screw element 22, 24 can be configured as a trapezoidal thread, the trapezoidal root 22*f*, 24*f* of which has a slightly larger diameter D1 than inner diameter D2 of first section 32 of fluid channel 20.

What is claimed is:

1. A linear guide device based on rolling-contact bearing technology for feeding working fluid to an assembly requiring working fluid, comprising:
    a working fluid selected from the group consisting of lubricating grease and lubricating oil;
    a plurality of fluid channels extending from a surface and including at least one fluid channel for feeding the working fluid, and at least one further fluid channel having a first section directly adjacent to the surface, a second section with a smaller diameter than that of said first section and, between the first section and the second section, having a first transition region with an annular surface, and
    at least one screw element screwed from the surface into the at least one further fluid channel for closing the latter, the at least one screw element having at least one sealing surface brought into sealing engagement with the annular surface, thereby forming a sealing effect without the use of additional sealing components, and
    wherein material of the at least one further fluid channel surrounding the annular surface is deformed in the second section by a pressure applied by the at least one screw element to the annular surface in the sense of reducing the volume of the at least one further fluid channel in the second section.

2. The device as recited in claim 1, wherein, when the at least one screw element is oriented along a longitudinal axis of the at least one further fluid channel, the at least one sealing surface is diametrically opposed to the annular surface and is configured complementary thereto, wherein, in the screwed-in state, the at least one screw element is seated flush on the annular surface along the at least one sealing surface.

3. The device as recited in claim 1, wherein the annular surface extends substantially orthogonally to the longitudinal axis of the at least one further fluid channel.

4. The device as recited in claim 1, wherein the annular surface is configured on an annular shoulder located in the first transition region and essentially concentrically enclosing the longitudinal axis of the at least one further fluid channel.

5. The device as recited in claim 1, wherein the second section includes a first subsection adjacent to the first transition region and a second subsection adjacent to the first subsection, wherein a diameter of the first subsection is larger than a diameter of the second subsection.

6. The device as recited in claim 5, wherein the first subsection is capable of buckling in an axial direction of the at least one further fluid channel when pressure is applied to the annular surface.

7. The device as recited in claim 5, wherein the first subsection includes a circumferential surface section directly adjacent to the annular surface of the first transition region and a second transition region that connects the circumferential surface section with the second subsection, the second transition region being configured as an annular surface that concentrically encloses a longitudinal axis of the at least one further fluid channel.

8. The device as recited in claim 7, wherein the surface of the second transition region adjacent to the at least one further fluid channel extends substantially orthogonally to the longitudinal axis of the at least one further fluid channel.

9. The device as recited in claim 1, wherein a length of the at least one screw element screwed into the at least one further fluid channel is sized such that the at least one screw element is capable of being brought into sealing engagement with the annular surface.

10. The device as recited in claim 9, wherein the length of the at least one screw element screwed in is greater than or equal to the distance between the annular surface and the surface.

11. The device as recited in claim 1, wherein a groove is provided in an outer circumferential surface of the at least one screw element, in which a sealing ring is capable of being located.

12. The device as recited in claim 1, wherein at least part of a thread of the at least one screw element is configured as a thread with a trapezoidal thread root, the diameter of which is slightly greater than an inner diameter of the first section of the at least one further fluid channel.

13. The device as recited in claim 1, wherein at least one of or both of the first section and the second section of the at least one further fluid channel are cylindrical in shape along at least a portion of their length.

14. The device as recited in claim 1, wherein at least one of or both of the first section and the second section of the at least one further fluid channel are conical in shape along at least a portion of their length.

15. The device as recited in claim 1, wherein the first section of the at least one further fluid channel is provided with a thread along a portion of its length.

16. The device as recited in claim 1, wherein the at least one further fluid channel extends from a surface of an attachment that is in fluid contact with the assembly.

17. The device as recited in claim 16, wherein the attachment is capable of being attached to the assembly.

18. The device as recited in claim 16, wherein the attachment includes a plurality of fluid channels.

19. The device as recited in claim 16, wherein at least a portion of the attachment is made of plastic.

20. The device as recited in claim 16, wherein all of the attachment is made of plastic.

21. A linear guide device based on rolling-contact bearing technology for feeding working fluid to an assembly requiring working fluid, comprising:
    a working fluid selected from the group consisting of lubricating grease and lubricating oil;
    a plurality of fluid channels extending from a surface and including at least one fluid channel for feeding the working fluid, and at least one further fluid channel having a first section directly adjacent to the surface, a second section with a smaller diameter than that of said first section and, between the first section and the second section, having a first transition region with an annular surface,
    and at least one screw element screwed from the surface into the at least one further fluid channel for closing the latter, the at least one screw element having at least one sealing surface brought into sealing engagement with the annular surface, thereby forming a sealing effect without the use of additional sealing components, wherein material of the at least one further fluid channel surrounding the annular surface is deformed in the second section by a pressure applied by the at least one screw element to the annular surface in the sense of reducing the volume of the at least one further fluid channel in the second section, and wherein the material of the at least one further fluid channel surrounding the annular surface is plastically deformed in the first transition region and in the second section via application of pressure.

22. A linear guide device based on rolling-contact bearing technology for feeding working fluid to an assembly requiring working fluid, comprising:

a working fluid selected from the group consisting of lubricating grease and lubricating oil;

a plurality of fluid channels extending from a surface and including at least one fluid channel for feeding the working fluid, and at least one further fluid channel having a first section directly adjacent to the surface, a second section with a smaller diameter than that of said first section and, between the first section and the second section, having a first transition region with an annular surface, and at least one screw element screwed from the surface into the at least one further fluid channel for closing the latter, the at least one screw element having at least one sealing surface brought into sealing engagement with the annular surface, thereby forming a sealing effect without the use of additional sealing components, wherein material of the at least one further fluid channel surrounding the annular surface is deformed in the second section by a pressure applied by the at least one screw element to the annular surface in the sense of reducing the volume of the at least one further fluid channel in the second section, wherein the second section includes a first subsection adjacent to the first transition region and a second subsection adjacent to the first subsection, wherein a diameter of the first subsection is larger than a diameter of the second subsection, and wherein the first subsection is deformed when pressure is applied to the annular surface such that the diameter of the at least one further fluid channel narrows in the region of the first subsection.

* * * * *